F. M. BRINCKERHOFF.
HOLDING SLEEVE FOR CONDUITS.
APPLICATION FILED FEB. 17, 1911.
1,037,200.
Patented Sept. 3, 1912.
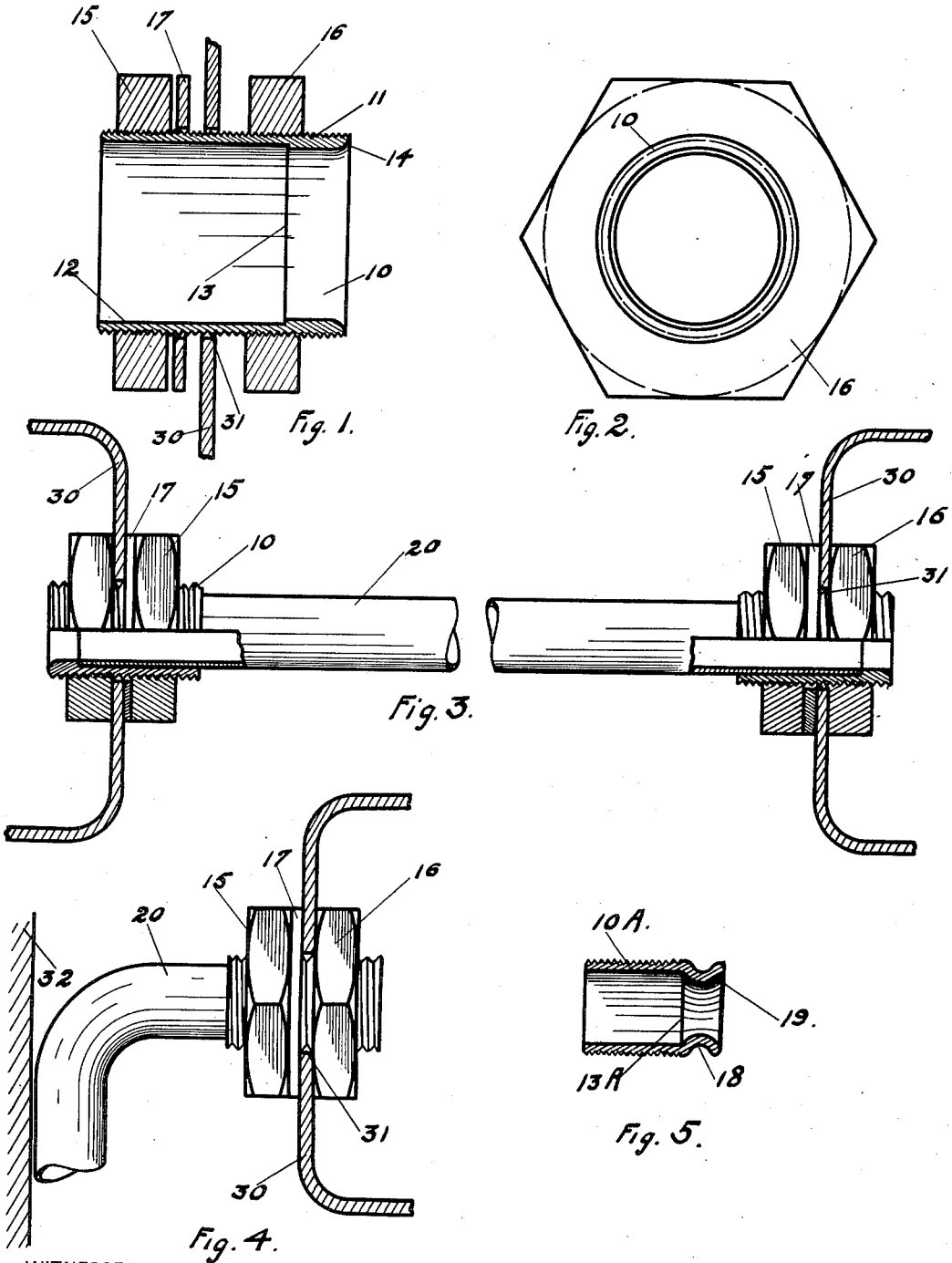

UNITED STATES PATENT OFFICE.

FRANK M. BRINCKERHOFF, OF NEW YORK, N. Y., ASSIGNOR TO THE ELLCON COMPANY, OF NEW YORK, N. Y., A CORPORATION OF NEW YORK.

HOLDING-SLEEVE FOR CONDUITS.

1,037,200.  Specification of Letters Patent.  Patented Sept. 3, 1912.

Application filed February 17, 1911. Serial No. 609,146.

*To all whom it may concern:*

Be it known that I, FRANK M. BRINCKERHOFF, a citizen of the United States, and a resident of the borough of Manhattan, in the city, county, and State of New York, United States of America, have invented certain new and useful Improvements in Holding-Sleeves for Conduits, of which the following is a specification.

My invention relates to a novel fitting for holding conduits in position and for suitably connecting them with junction boxes or other structures. Its object is to provide a simple, light and inexpensive fitting by means of which the conduit may be quickly and easily installed and which will effectively hold the conduit in place.

I will describe my invention in the following specification and point out the novel features thereof in the appended claims.

Referring to the drawings, Figure 1 is a sectional side elevation of a preferred form of a holding sleeve made according to my invention, together with a portion of the structure to which it is to be affixed. Fig. 2 is a front elevation of the device. In Fig. 3 I have shown portions of two junction boxes with a conduit running between them, each end of the conduit being connected with one of the junction boxes and held in place by one of my improved fittings. This figure is a side elevation, partly in section. Fig. 4 illustrates a similar use of my invention under somewhat different conditions. A modified form of my invention is shown in sectional side elevation in Fig. 5. In this case the holding nuts and washer are omitted from the drawing.

Like characters of reference designate corresponding parts in all of the figures.

10 designates a metallic sleeve, the outer surface of which is threaded as at 11. The inner diameter of this sleeve is somewhat less than the outside diameter of the conduit with which it is to be used. From one end the inside of this sleeve is bored out as shown at 12 to a size slightly larger than the outside diameter of the conduit, so that this sleeve may be readily slipped over the end of the conduit. The end of this bore will form a shoulder or abutment 13. The other end of this sleeve is preferably rounded or chamfered as at 14.

15 and 16 are nuts fitted to the threads on the outside of the sleeve.

17 is a lock washer. This is not an essential part of the device as it may be used without any washer, or with a plain washer if preferred.

The conduit is designated in the drawings by 20. By "conduit" I mean a comparatively thin metallic tube such as is in common use for the mechanical protection of insulated electrical conductors.

30 designates portions of junction boxes or other structures with which the conduit is to be connected. These structures are provided with holes 31 of sufficient size to allow the sleeves 10 to be passed freely through them.

The junction boxes are usually in fixed positions, and the electrical conductors are to be carried to them. The conduit is cut into suitable lengths to reach these junction boxes. The improved holding sleeves are passed through the holes 30 in adjacent junction boxes and are slipped over the ends of the conduit which runs between these boxes. The nuts 15 and 16 are applied from opposite sides of the wall of the junction box. By means of the outside nuts 15 the sleeves may be moved relatively to the conduit until the shoulders 13 are up tight against the ends of the conduit. The inside nuts may then be tightened so that all of the parts will thereby be securely held in place. If the lock washers are used these of course help to hold the parts together. By the use of this device the conduits used need not be cut to such exact lengths as is necessary with other devices, as the shoulder 13 is an adjustable abutment movable relative to the junction box and the conduit, and may be quickly brought into the desired position by means of the nuts 15 and 16. The manner in which the sleeves on opposite ends of a conduit coact with the conduit and with each other to hold the conduit in place between two junction boxes is clearly shown in Fig. 3.

In Fig. 4 the conduit 20 is shown with a transverse bend in it and with one of its parts backed up against a wall 32. The holding sleeve 10 is applied, as before, and it is obvious that the adjustable position of the shoulder 13 may be utilized under such conditions to force the conduit back against the wall so as to hold it in desired position. The sleeve 10ᴬ, shown in Fig. 5, is for the same purpose and is to be used in a similar manner. In this case a part of the sleeve near one of its ends is rolled or otherwise forced inward as at 18 to form the abutment 13ᴀ. The end 19 is rounded or flared as shown.

Devices made according to my invention are especially designed for use with thin tubing which is not easily threaded and which should not be subjected to crushing pressures. Because of the facts that the conduit need not be threaded and that the sleeves provide adjustable abutments for the ends of the conduit, the installation is facilitated and may be done much more quickly, and consequently at lower cost, than such devices as have heretofore been available.

What I claim is.—

1. A holding sleeve for conduits comprising a smooth portion adapted to surround the conduit, a holding abutment for the end of the conduit at one end of said portion, and means for moving the position of said sleeve relatively to a stationary object and for affixing said sleeve to the stationary object.

2. A hollow cylindrical holding sleeve for conduits having its outer surface threaded said sleeve constructed to form a smooth inner portion adapted to surround the conduit and a holding abutment for the end of the conduit at one end of said portion; a pair of nuts upon the outer threaded portion arranged to adjust the longitudinal position of the sleeve and the abutment therein relative to a stationary object and to affix the sleeve to the stationary object.

3. A hollow cylindrical holding sleeve for conduits having its outer surface threaded, said sleeve constructed to form a smooth annular inner portion adapted to loosely surround the conduit and an annular holding abutment for the end of the conduit at one end of said portion; a pair of nuts upon said outer threaded portion arranged to adjust the longitudinal position of the sleeve and the abutment therein relative to the wall of a junction box or the like, and a lock washer between said wall and one of said nuts.

4. The combination with a conduit, of a pair of smooth bored holding sleeves, one on either end of the conduit, each of said sleeves having its outer surface threaded and constructed to form a portion adapted to loosely surround the conduit and an abutment for the end of the conduit at one end of said portion, and means for moving said sleeves longitudinally relatively to stationary objects to adjust the positions of said abutments.

5. The combination with a conduit, of a pair of hollow smooth bored cylindrical holding sleeves, one on either end of the conduit, each of said sleeves having its outer surface threaded and comprising a portion adapted to loosely surround the conduit and an annular abutment for the end of the conduit at one end of said portion, a pair of junction boxes, a pair of nuts on each sleeve arranged to move said sleeves longitudinally relatively to the junction boxes to adjust the positions of said abutments, said nuts being also arranged to affix the sleeves to said boxes.

In testimony whereof I have signed my name to this specification in the presence of two subscribing witnesses.

FRANK M. BRINCKERHOFF.

Witnesses:
CHAS. R. ELLICOTT,
ERNEST W. MARSHALL.